(12) United States Patent
Noyes et al.

(10) Patent No.: US 11,782,859 B2
(45) Date of Patent: Oct. 10, 2023

(54) METHODS AND SYSTEMS FOR DEVICES WITH SELF-SELECTING BUS DECODER

(71) Applicant: Micron Technology, Inc., Boise, ID (US)

(72) Inventors: Harold B Noyes, Boise, ID (US); Steven P. King, Boise, ID (US)

(*) Notice: Subject to any disclaimer, the term of this patent is extended or adjusted under 35 U.S.C. 154(b) by 0 days.

(21) Appl. No.: 17/184,372

(22) Filed: Feb. 24, 2021

(65) Prior Publication Data

US 2021/0182224 A1     Jun. 17, 2021

Related U.S. Application Data

(63) Continuation of application No. 16/799,444, filed on Feb. 24, 2020, now Pat. No. 10,942,877, which is a continuation of application No. 16/247,244, filed on Jan. 14, 2019, now Pat. No. 10,572,414, which is a continuation of application No. 15/728,151, filed on Oct. 9, 2017, now Pat. No. 10,180,922, which is a continuation of application No. 13/801,447, filed on Mar. 13, 2013, now Pat. No. 9,785,588, which is a continuation of application No. 12/268,270, filed on Nov. 10, 2008, now Pat. No. 8,402,188.

(51) Int. Cl.
    *G06F 13/28*         (2006.01)
    *G06F 13/38*         (2006.01)
    *G06F 13/40*         (2006.01)

(52) U.S. Cl.
    CPC .............. *G06F 13/28* (2013.01); *G06F 13/38* (2013.01); *G06F 13/385* (2013.01); *G06F 13/4004* (2013.01); *G06F 13/4027* (2013.01)

(58) Field of Classification Search
    CPC ........ G06F 13/28; G06F 13/38; G06F 13/385; G06F 13/4004; G06F 13/4027; G06F 13/4022
    See application file for complete search history.

(56) References Cited

U.S. PATENT DOCUMENTS

| | | |
|---|---|---|
| 5,300,830 A | 4/1994 | Hawes |
| 5,331,227 A | 7/1994 | Hawes |
| 5,537,664 A * | 7/1996 | Rowland ................. G06F 13/20 |
| | | 710/107 |
| 5,754,878 A | 5/1998 | Asghar |
| 5,850,541 A * | 12/1998 | Sugimoto ............. G06F 1/3287 |
| | | 713/601 |
| 5,881,312 A | 3/1999 | Dulong |
| 6,178,469 B1 | 1/2001 | Hennessy et al. |
| 6,240,003 B1 | 5/2001 | McElroy |
| 6,279,128 B1 | 8/2001 | Arnold |

(Continued)

OTHER PUBLICATIONS

Hurson A. R.; A VLSI Design for the Parallel Finite State Automaton and Its Performance Evaluation as a Hardware Scanner; International Journal of Computer and Information Sciences, vol. 13, No. 6. (1984).

(Continued)

*Primary Examiner* — Raymond N Phan
(74) *Attorney, Agent, or Firm* — Fletcher Yoder, P.C.

(57) ABSTRACT

Disclosed are devices and methods, among which is a device peripheral to a controller device that is used to provide memory access to the controller device. In some embodiments, the device may determine and provide a response of the device to requests from the separate device.

20 Claims, 14 Drawing Sheets

(56) References Cited

U.S. PATENT DOCUMENTS

| | | |
|---|---|---|
| 6,880,087 B1 | 4/2005 | Carter |
| 6,906,938 B2 | 6/2005 | Kaginele |
| 6,925,510 B2 | 8/2005 | Yu |
| 6,944,710 B2 | 9/2005 | Regev et al. |
| 7,058,750 B1 | 6/2006 | Rankin et al. |
| 7,089,352 B2 | 8/2006 | Regev et al. |
| 7,130,231 B2 | 10/2006 | Cochran |
| 7,146,643 B2 | 12/2006 | Dapp et al. |
| 7,185,128 B1 | 2/2007 | Kotlowski et al. |
| 7,392,229 B2 | 6/2008 | Harris et al. |
| 7,487,131 B2 | 2/2009 | Harris et al. |
| 7,487,542 B2 | 2/2009 | Boulanger |
| 7,512,634 B2 | 3/2009 | McMillen et al. |
| 7,627,793 B2 | 12/2009 | Johnson |
| 7,774,286 B1 | 8/2010 | Harris |
| 7,917,684 B2 | 3/2011 | Noyes et al. |
| 7,970,964 B2 | 6/2011 | Noyes |
| 8,065,249 B1 | 11/2011 | Harris |
| 8,140,780 B2 | 3/2012 | Noyes |
| 8,209,521 B2 | 6/2012 | Noyes et al. |
| 8,214,672 B2 | 7/2012 | Pawlowski |
| 8,281,395 B2 | 10/2012 | Pawlowski |
| 9,785,588 B2 | 10/2017 | Noyes et al. |
| 10,180,922 B2 | 1/2019 | Noyes et al. |
| 2003/0126346 A1 | 7/2003 | Kuo |
| 2003/0163615 A1 | 8/2003 | Yu |
| 2005/0138236 A1* | 6/2005 | Hwang ........... G06F 13/28 710/24 |
| 2005/0256980 A1 | 11/2005 | Kazuma |
| 2006/0253610 A1 | 11/2006 | Yamada et al. |
| 2007/0028226 A1 | 2/2007 | Chen et al. |
| 2007/0075878 A1 | 4/2007 | Furodet et al. |
| 2007/0186028 A2 | 8/2007 | Kissell |
| 2008/0005297 A1 | 1/2008 | Kjos et al. |
| 2009/0193159 A1 | 7/2009 | Li et al. |
| 2009/0216912 A1 | 8/2009 | Lee et al. |
| 2010/0100691 A1 | 4/2010 | Noyes et al. |
| 2010/0115347 A1 | 5/2010 | Noyes |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0174887 A1 | 7/2010 | Pawlowski |
| 2010/0185647 A1 | 7/2010 | Noyes |
| 2011/0307433 A1 | 12/2011 | Dlugosch |
| 2011/0307503 A1 | 12/2011 | Dlugosch |
| 2012/0036400 A1 | 2/2012 | Miller |
| 2012/0192163 A1 | 7/2012 | Glendenning et al. |
| 2012/0192164 A1 | 7/2012 | Xu et al. |
| 2012/0192165 A1 | 7/2012 | Xu |
| 2012/0192166 A1 | 7/2012 | Xu et al. |
| 2014/0215116 A1 | 7/2014 | Lee et al. |
| 2015/0356049 A1 | 12/2015 | Bacha et al. |

OTHER PUBLICATIONS

Lipovski, G.; Dynamic Systolic Associative Memory Chip; IEEE; Department of Electrical and Computer Engineering; University of Texas at Austin; pp. 481-492 (1990).

Prais et al., Method for Address Decode for Memory Card, IP.Com Journal, IP.Com Inc., vol. 33. No. 2 (1990).

Bird, S. et al.; One-Level Phonology: Autosegmental Representations and Rules as Finite Automata; Association for Computational Linguistics; University of Edinburgh; vol. 20; No. 1; pp. 55-90 (1994).

Schultz, K. et al.; Fully Parallel Integrated CAM/RAM Using Preclassification to Enable Large Capacities; IEEE Journal on Solid-State Circuits; vol. 31; No. 5; pp. 689-699 (May 1996).

Shafai, F. et al.; Fully Parallel 30-MHz, 2.5-Mb CAM; IEEE Journal of Solid-State Circuits, vol. 33; No. 11; pp. 1690-1696 (Nov. 1998).

Beesley, K. R.; Arabic Morphology Using Only Finite-State Operations; Xerox Research Centre Europe; pp. 50-57 (1998).

Wada, T.; Multiobject Behavior Recognition Event Driven Selective Attention Method; IEEE; pp. 1-16 (2000).

Fisk, M. et al.; Applying Fast String Matching to Intrusion Detection; Los Alamos National Laboratory; University of California San Diego; pp. 1-21 (Sep. 2001).

Sidhu, R. et al.; Fast Regular Expression Pattern Matching using FPGAs; Department of EE—Systems; University of Southern California; pp. 1-12 (2001).

Clark, C.; Design of Efficient FPGA Circuits for Matching Complex Patterns in Network Intrusion Detection Systems (Master of Science Thesis); Georgia Institute of Technology; pp. 1-56 (Dec. 2003).

Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9 (2004).

Fide, S.; String Processing in Hardware; Scalable Parallel and Distributed Systems Lab; Proceedings of the $12^{th}$ Annual IEEE symposium on Field-Programmable Custom Computing Machines (FCCM'04);School of Electrical and Computer Engineering; Georgia Institute of Technology; pp. 1-9 (2004).

Clark, C. et al.; A Unified Model of Pattern-Matching Circuit Architectures; Tech Report GIT-CERCS-05-20;Georgia Institute of Technology; pp. 1-17 (2005).

Bispo, J. et al.; Regular Expression Matching for Reconfigurable Packet Inspection; IEEE (2006).

Brodie, B. et al.; A scalable Architecture for High-Throughput Regular-Expression Pattern Matching; Exegy Inc.; pp. 1-12 (2006).

Clark, C.; A Unified Model of Pattern-Matching Circuits for Field-Programmable Gate Arrays [Doctoral Dissertation]; Georgia Institute of Technology; pp. 1-177 (2006).

Korenek, J.; Traffic Scanner-Hardware Accelerated Intrusion Detection System; http://www.liberouter.org/; (2006).

Yu, F.; High Speed Deep Packet Inspection with Hardware Support; Electrical Engineering and Computer Sciences; University of California at Berkeley; pp. 1-217 (Nov. 22, 2006).

Bispo, J. et al.; Synthesis of Regular Expressions Targeting FPGAs: Current Status and Open Issues; IST/INESC-ID, Libson, Portugal; pp. 1-12 (2007).

Freescale and Kaspersky® Accelerated Antivirus Solution Platform for OEM Vendors; Freescale Semiconductors Document; pp. 1-16 (2007).

Kumar, S. et al.; Curing Regular Expressions matching Algorithms from Insomnia, Amnesia, and Aculuia; Department of Computer Science and Engineering; Washington University in St. Louis; pp. 1-17 (Apr. 27, 2007).

Lin, C. et al.; Optimization of Pattern Matching Circuits for Regular Expression on FPGA; IEEE Transactions on Very Large Scale Integrations Systems; vol. 15, No. 12, pp. 1-6 (Dec. 2007).

U.S. Appl. No. 60/652,738, filed Feb. 12, 2005, Harris.

\* cited by examiner

METHODS AND SYSTEMS FOR DEVICES WITH SELF-SELECTING BUS DECODER

CROSS REFERENCE TO RELATED APPLICATIONS

This application is a continuation of U.S. patent application Ser. No. 16/799,444, entitled "Methods and Systems for Devices with Self-Selecting Bus Decoder", filed on Feb. 24, 2020, which is herein incorporated by reference, and which is a continuation of U.S. patent application Ser. No. 16/247,244, entitled "Methods and Systems for Devices with Self-Selecting Bus Decoder", filed on Jan. 14, 2019, which is herein incorporated by reference, and which is a continuation of U.S. patent application Ser. No. 15/728,151, entitled "Methods and Systems for Devices with Self-selecting Bus Decoder", filed on Oct. 9, 2017, which is herein incorporated by reference, and which is a continuation of U.S. patent application Ser. No. 13/801,447, entitled "Methods and Systems for Devices with Self-selecting Bus Decoder", filed Mar. 13, 2013, which is herein incorporated by reference, and which is a continuation of U.S. patent application Ser. No. 12/268,270, entitled "Methods and Systems for Devices with Self-selecting Bus Decoder", filed Nov. 10, 2008, which is herein incorporated by reference, now U.S. Pat. No. 8,402,188, which issued on Mar. 19, 2013.

BACKGROUND

Field of Invention

Embodiments of the invention relate generally to electronic devices and, more specifically, in certain embodiments, to electronic devices having a bus translator.

Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware that performs pattern recognition has been designed, and this hardware is believed to be capable of searching a data stream for a relatively large number of patterns relatively quickly. However, implementing this hardware is complicated by the variety of devices with which the hardware might interface. Pattern-recognition devices, and associated peripheral devices, may be coupled to a variety of different types of devices, e.g., microcontrollers. "Single-chip microcontrollers" are microprocessors that typically have integrated functions such as program storage, data storage, interfaces etc. Such microcontrollers are often designed for a dedicated and specific functionality and/or device.

However, because microcontrollers often provide these integrated functions at a lower cost, adding additional program storage, data storage, or other functions may increase the cost of the microcontroller, reducing the feasibility of use of the microcontroller in a system or device. For example, the addition of memory, such as RAM, ROM, etc, often includes the addition of a memory management unit. Further, such microcontrollers often have multiplexed buses to reduce die size, package size, etc. Typically, an added function will also include a gate-array device to perform bus translation. The microcontroller may not have the power and/or the space to implement these additional components, and such external functions may not be cost-feasible.

Further, additional features or enhancement to such microcontrollers may employ more program or data storage in the form or RAM, ROM, or other memory. Because of the challenges described above, system developers often must wait for newer microcontroller having the desired features, or more expensive microcontrollers with the features added externally. Further, as described above, adding additional or enhanced functions often creates die size, power, and cost challenges.

This issue is not limited to pattern-recognition devices. Other devices that communicate with microcontrollers face similar issues. Any added or enhanced functionality to a microcontroller may encounter the challenges described above.

DETAILED DESCRIPTION

Figure 1:
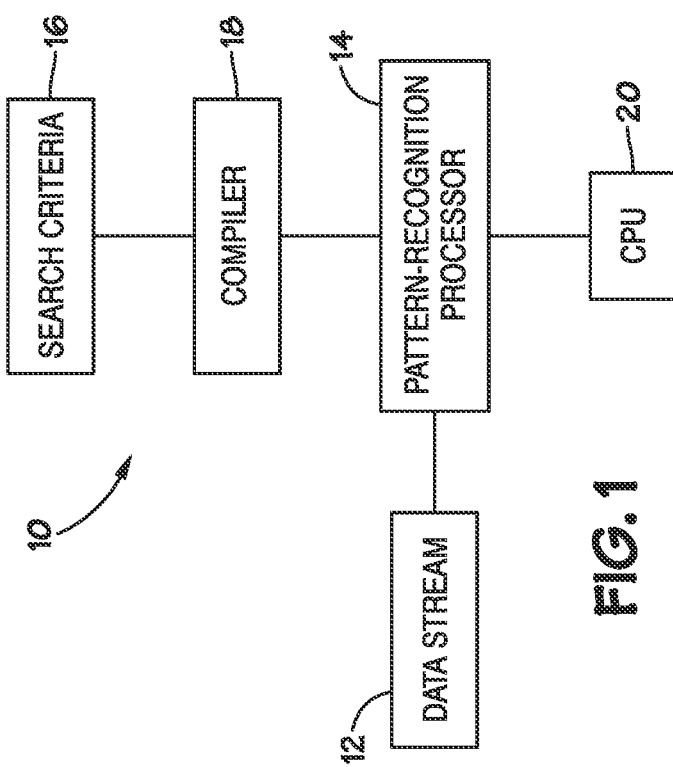
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be a hardware device that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
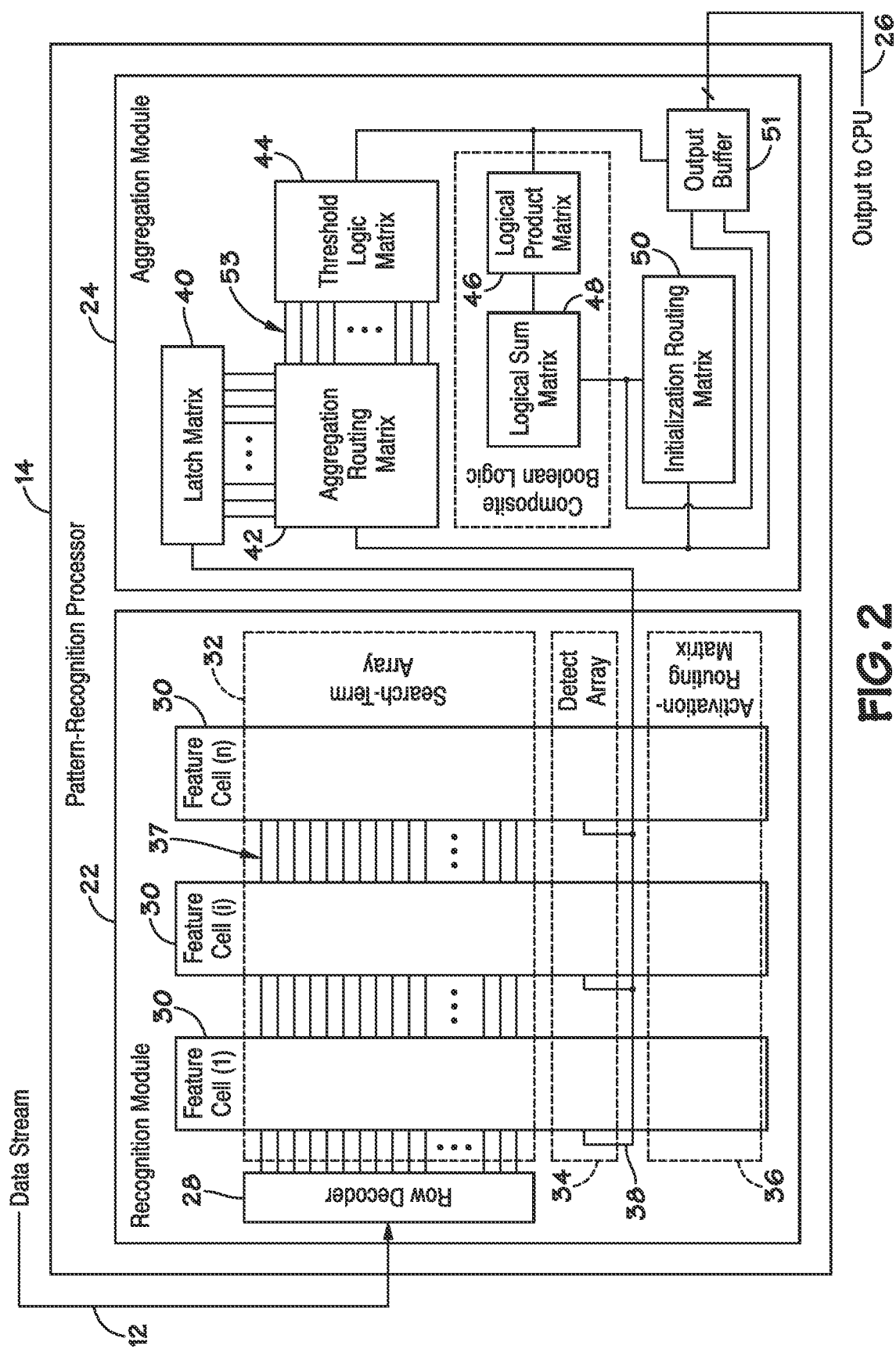
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 may be transmitted to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
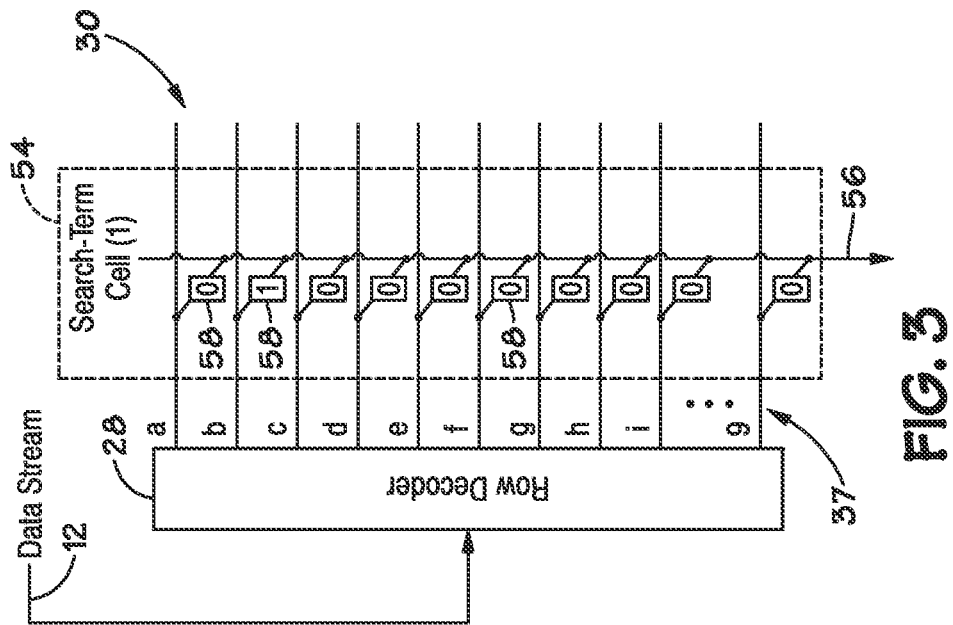
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

Figure 4:
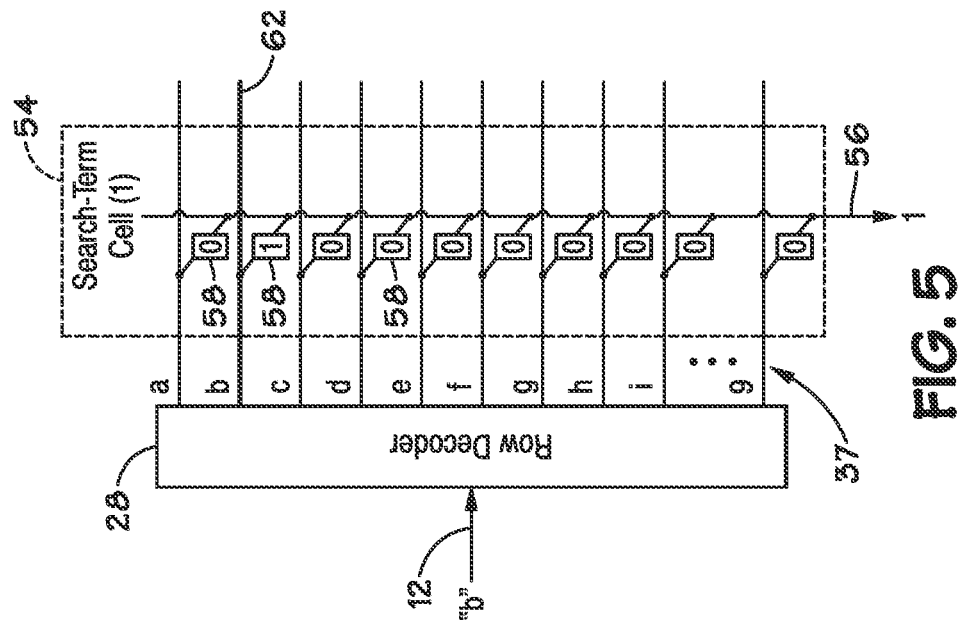
FIGS. 4 and 5 depict the search-term cell of FIG. 3 searching the data stream for a single character.
Figure 5:
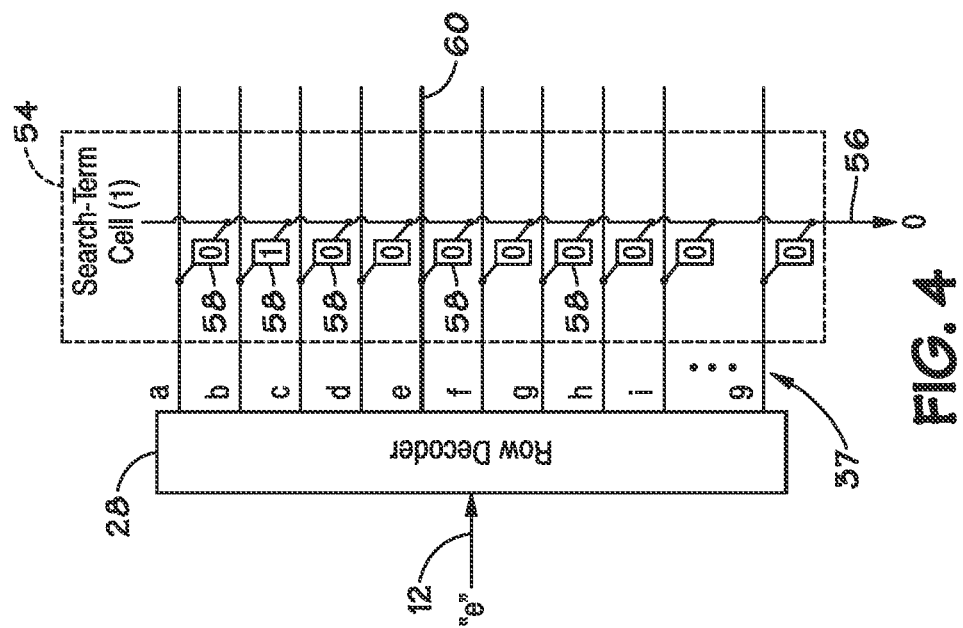

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
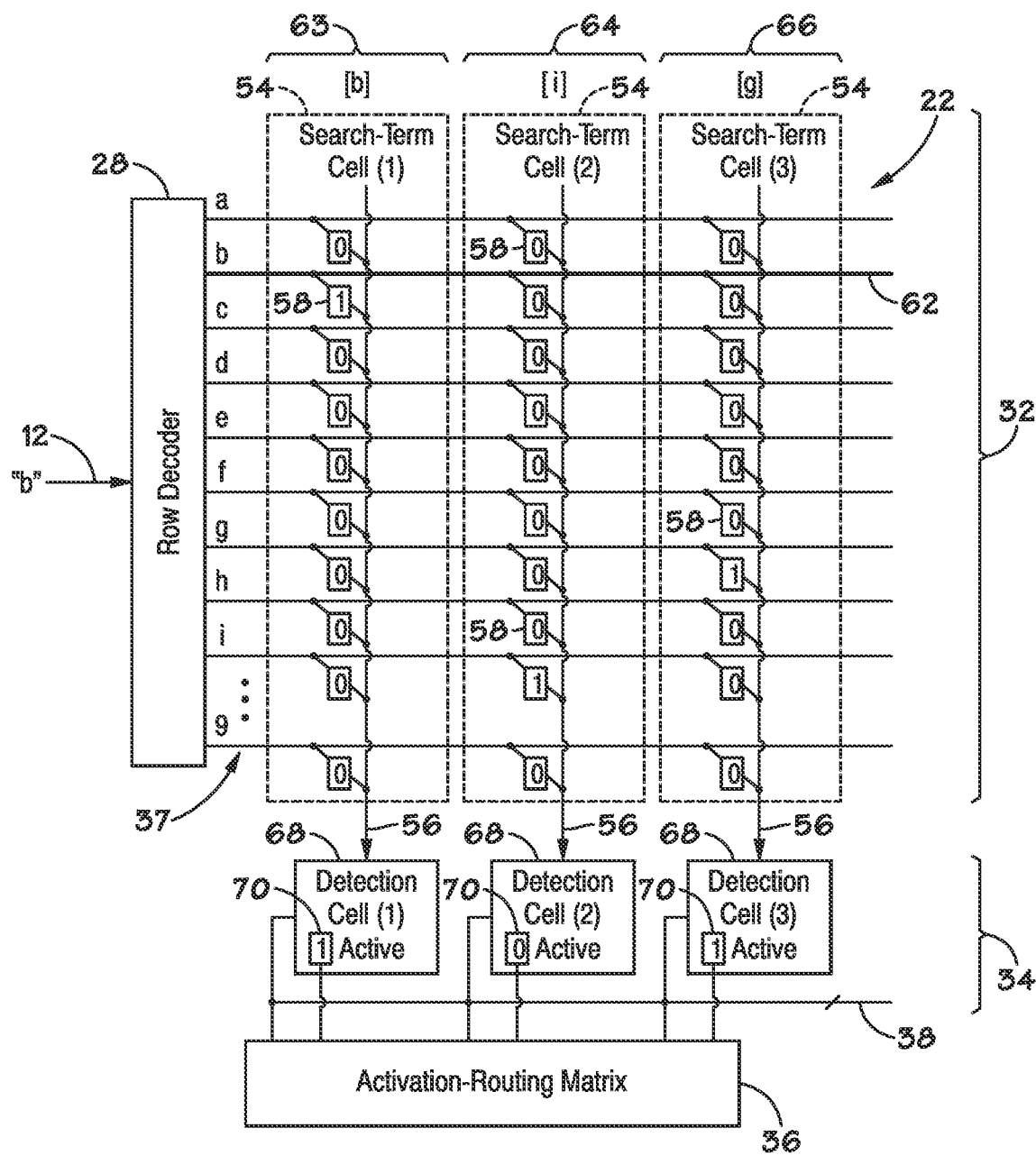
FIGS. 6-8 depict a recognition module including several search-term cells searching the data stream for a word.
Figure 7:
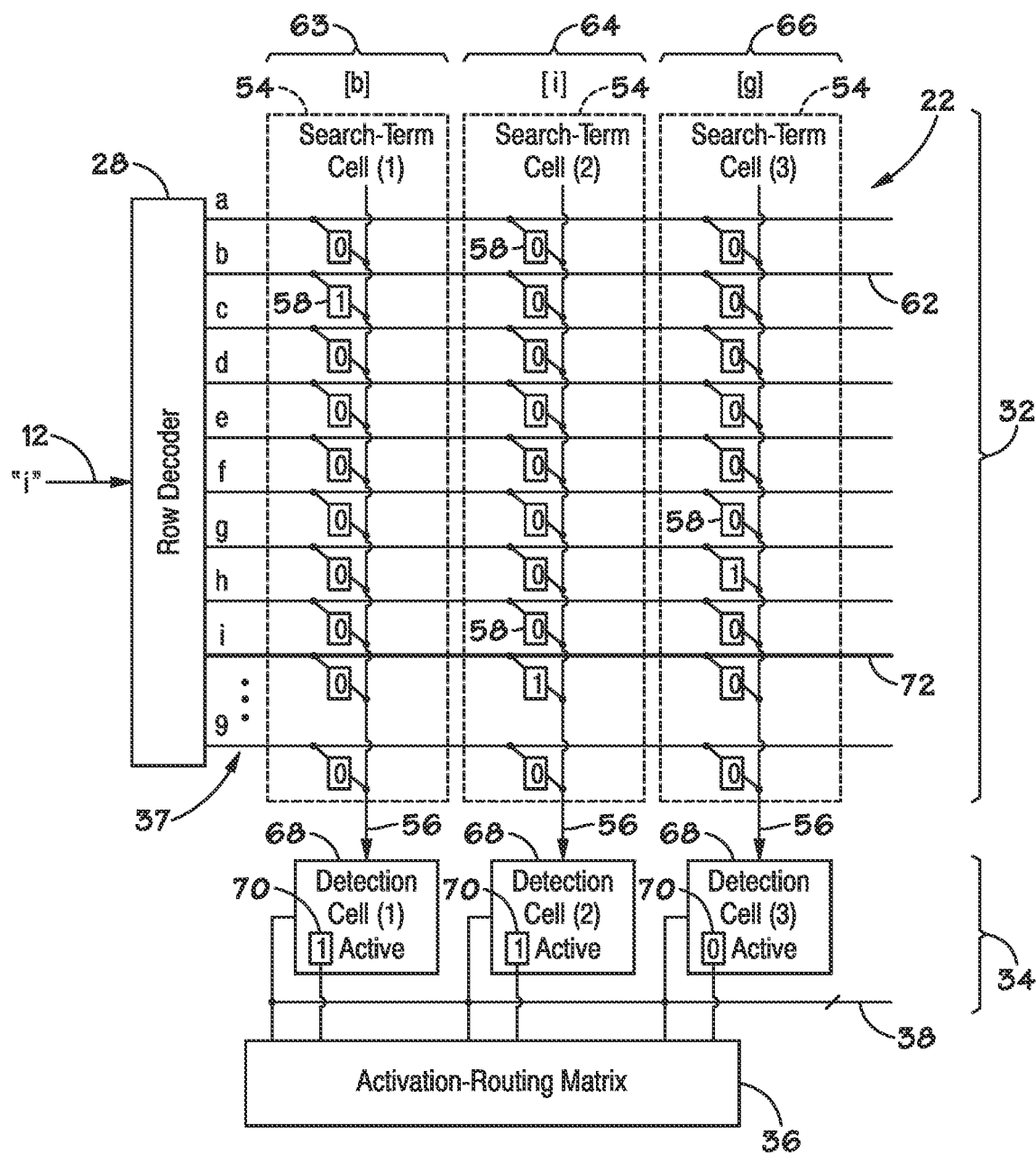
Figure 8:
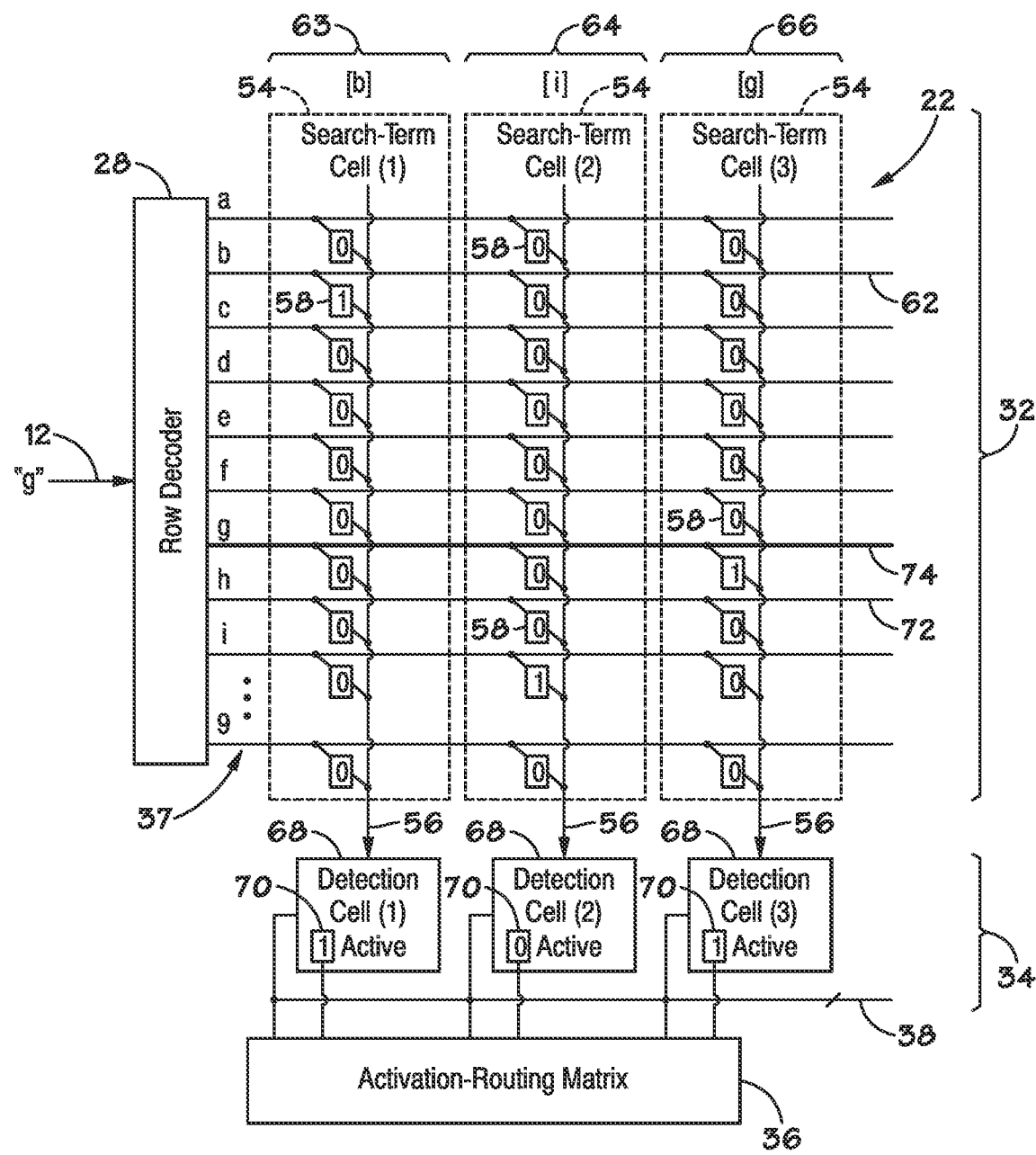

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
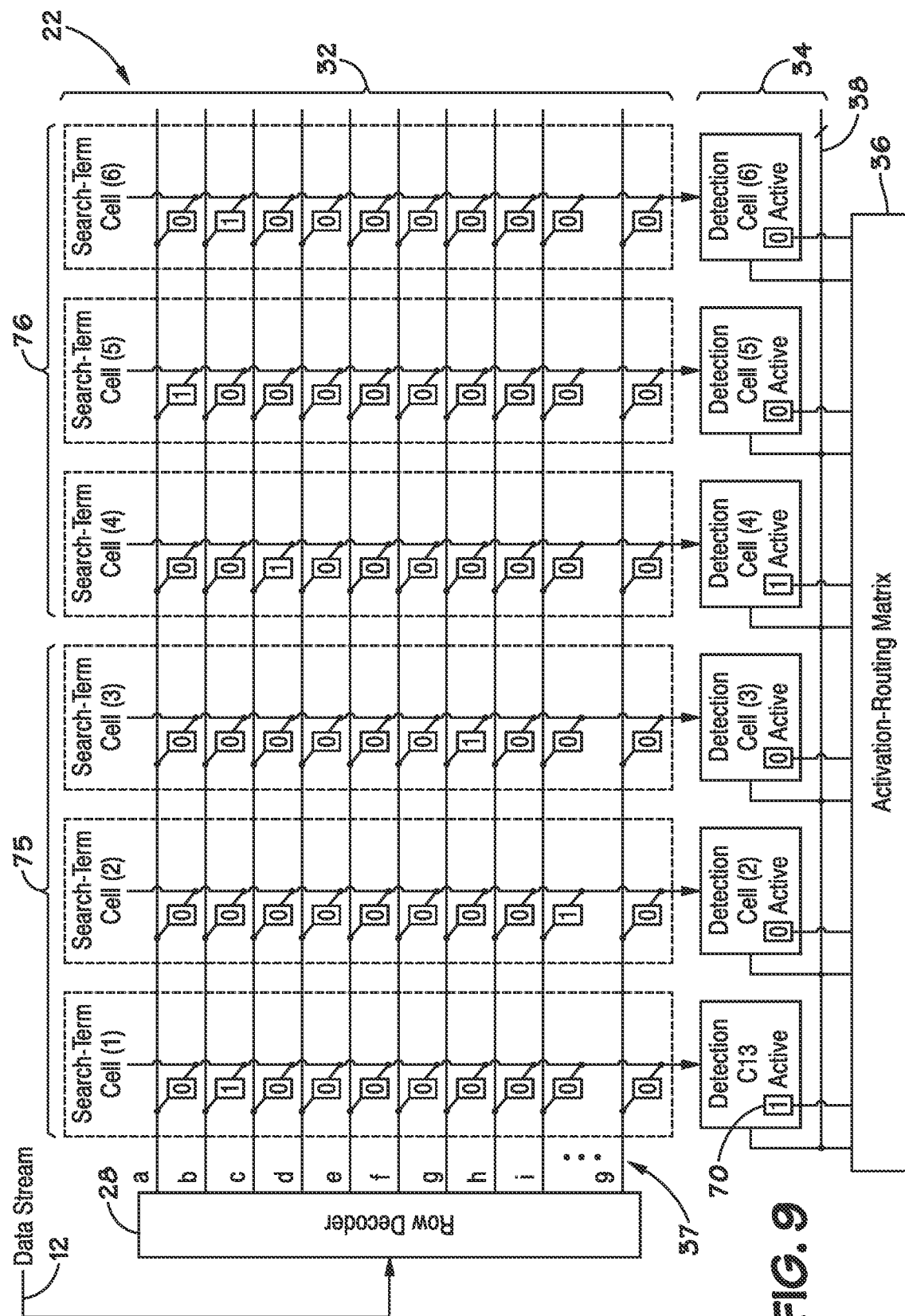
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
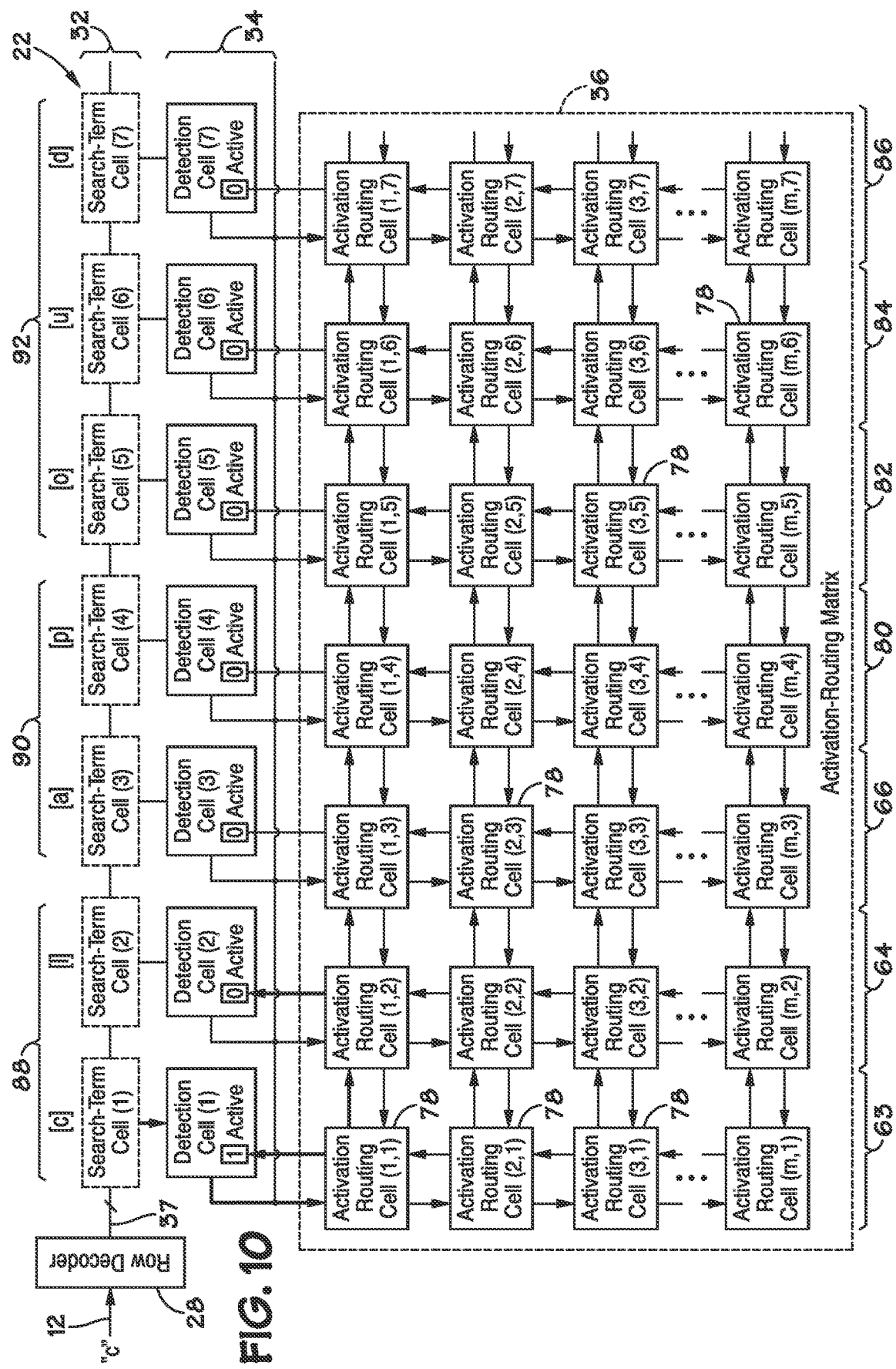
FIGS. 10-12 depict the recognition module searching according to a search criterion that specifies multiple words with the same prefix.
Figure 11:
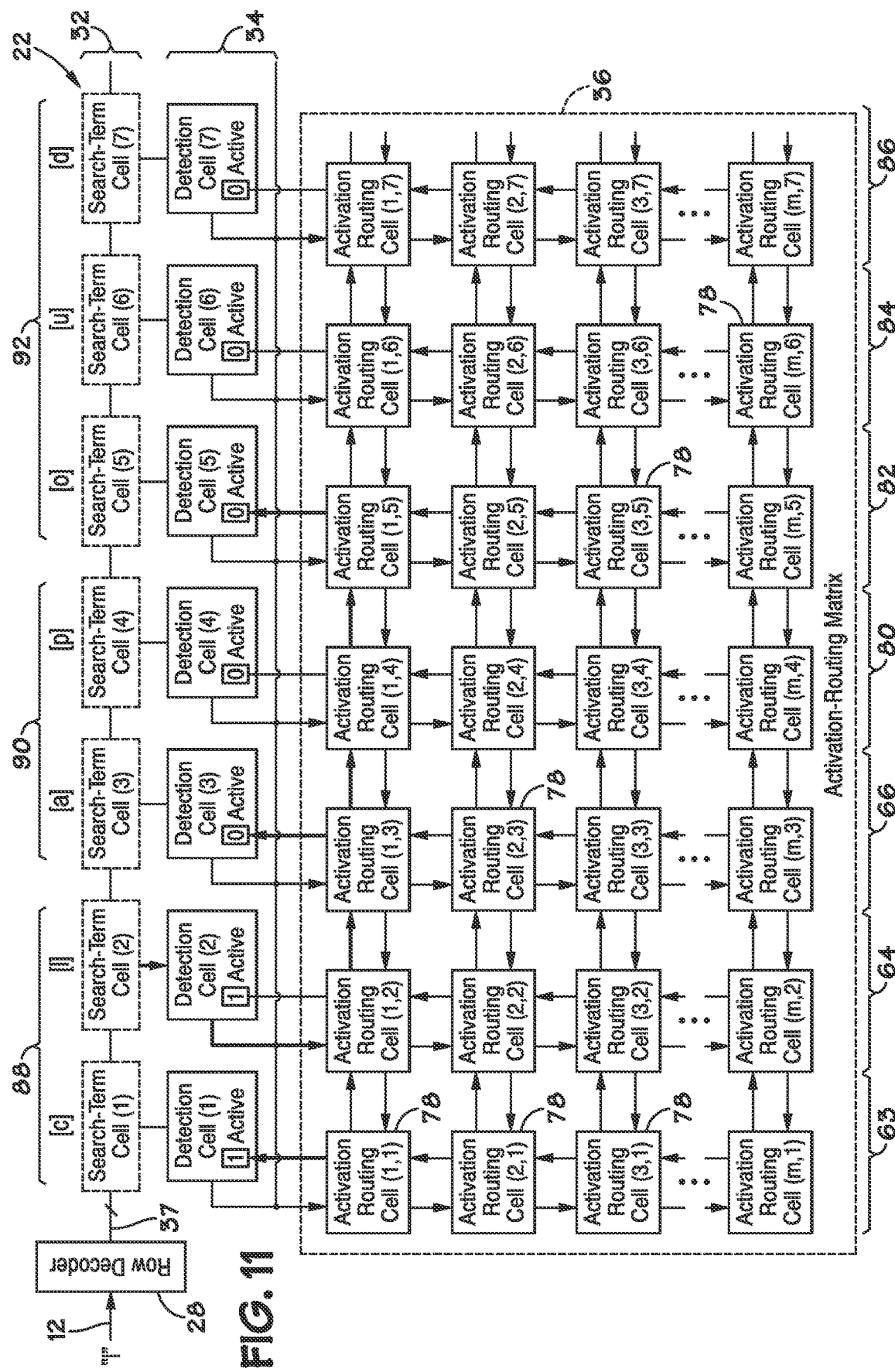
Figure 12:
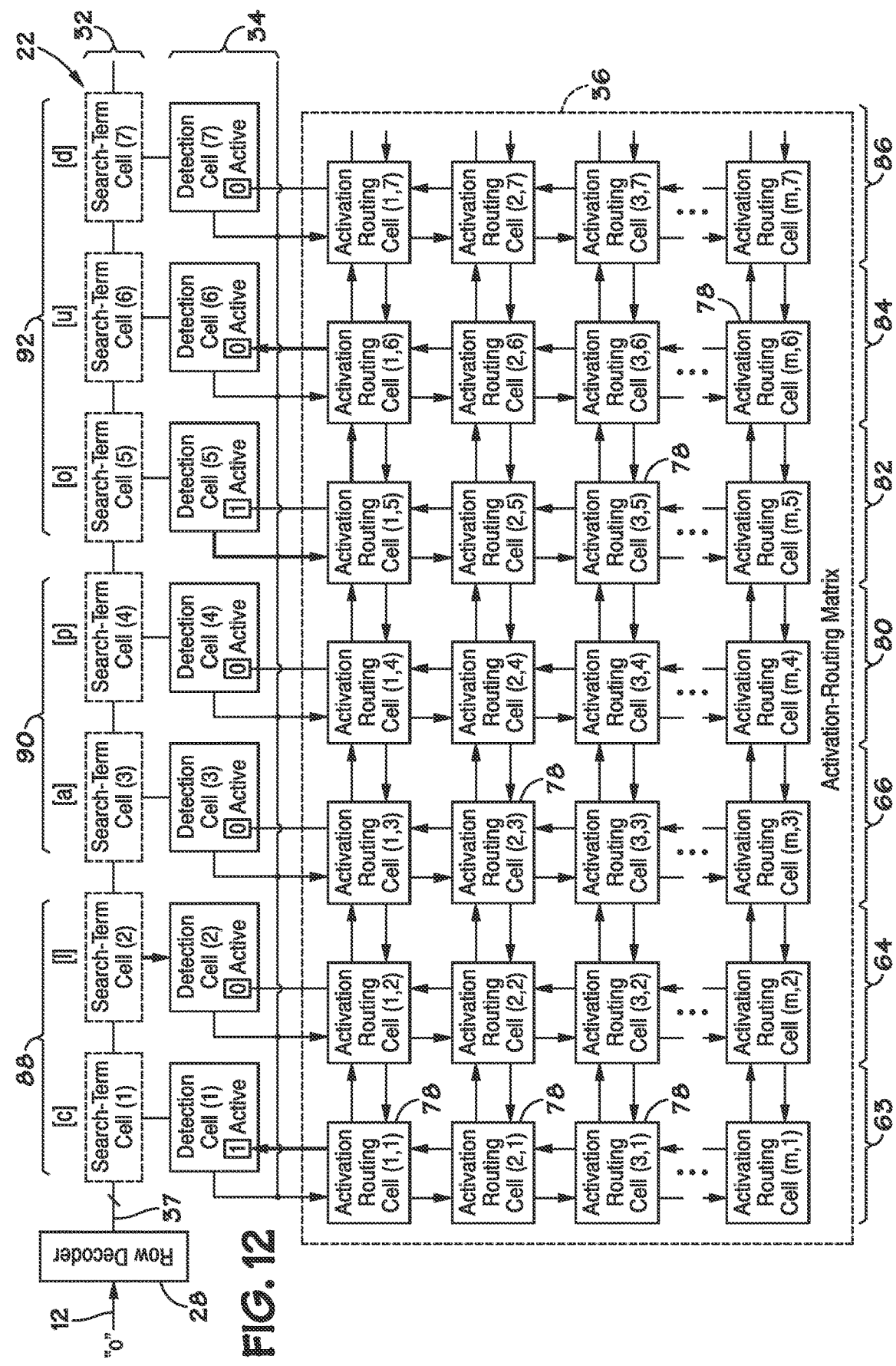

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

In some embodiments, the pattern recognition functionality provided by the pattern-recognition processor 14 may be added to an existing system or device having a microcontroller. For example, the pattern-recognition processor 14 may be connected to the microcontroller as a peripheral device (e.g., a device external to the microcontroller), or some or all of the pattern-recognition functionality may be added to the microcontroller via additional software, firmware, and/or hardware. In either case, the microcontroller may use additional memory for providing, storing, and processing the data stream 12. For example, a microcontroller may provide search terms to an external device or receive search results from the external device. In such an embodiment, the external device may include volatile or non-volatile memory, e.g., DRAM, SRAM, Flash, ROM, PROM, EEPROM, etc. The peripheral device may also include functionality such as pattern recognition, data acquisition, or any other suitable functionality.

Figure 13:
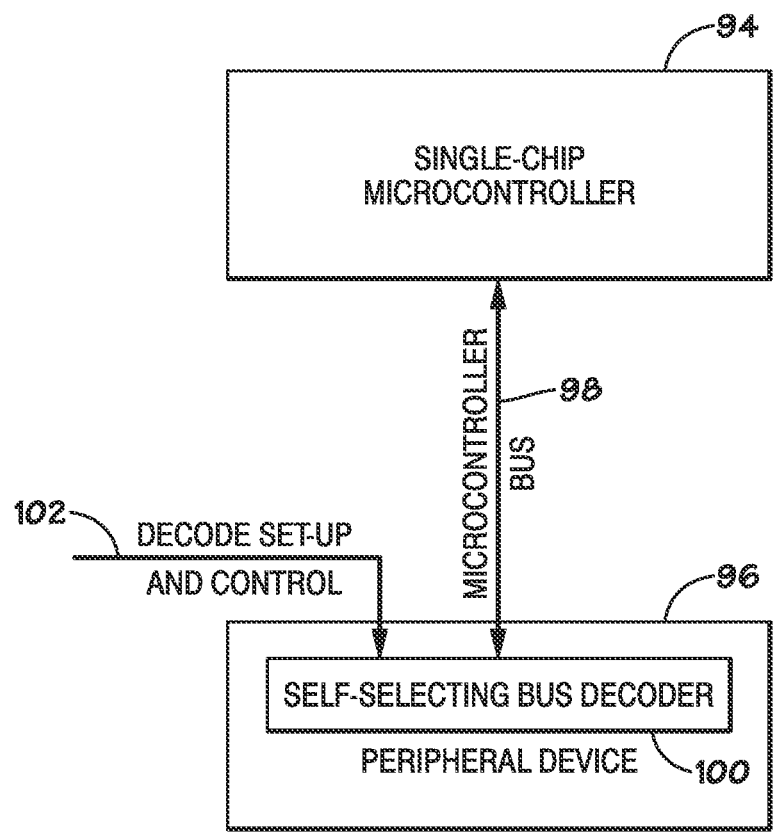
FIG. 13 depicts an embodiment of a peripheral device having a self-selecting bus decoder coupled to a microcontroller.

FIG. 13 illustrates an embodiment of a single-chip microcontroller 94 and a peripheral device 96 accessible by the microcontroller 94 over a microcontroller bus 98. The microcontroller 94 may include any functionality, such as data processing, data storage, interfaces, etc. Because of the integrated functionalities provided in the microcontroller 94, in a typical embodiment, the microcontroller 94 does not provide any memory management, bus translation, or other externally accessible functions or components to enable the addition of the peripheral device 96. As mentioned above, in some embodiments the peripheral device may include some type of memory, such as DRAM.

The peripheral device 96 may include a self-selecting bus decoder 100. As described further below, the self-selecting bus decoder 100 receives a memory mapping configuration and self-selects memory access, as requested by a signal from the microcontroller 94 on each bus-cycle. The bus decoder 100 may receive signals from the microcontroller 94 over the microcontroller bus 98 and may also receive decode set-up and control signal 102. The self-selecting bus decoder 100 enables the addition of the peripheral device 96 to the microcontroller 94 without adding any components to the microcontroller 94 or between the peripheral device 96 and the microcontroller 94. Thus, the peripheral device 96 may be added to a printed circuit assembly (PCA) containing the microcontroller 94 and connected via printed circuit traces to the microcontroller 94.

Figure 14:
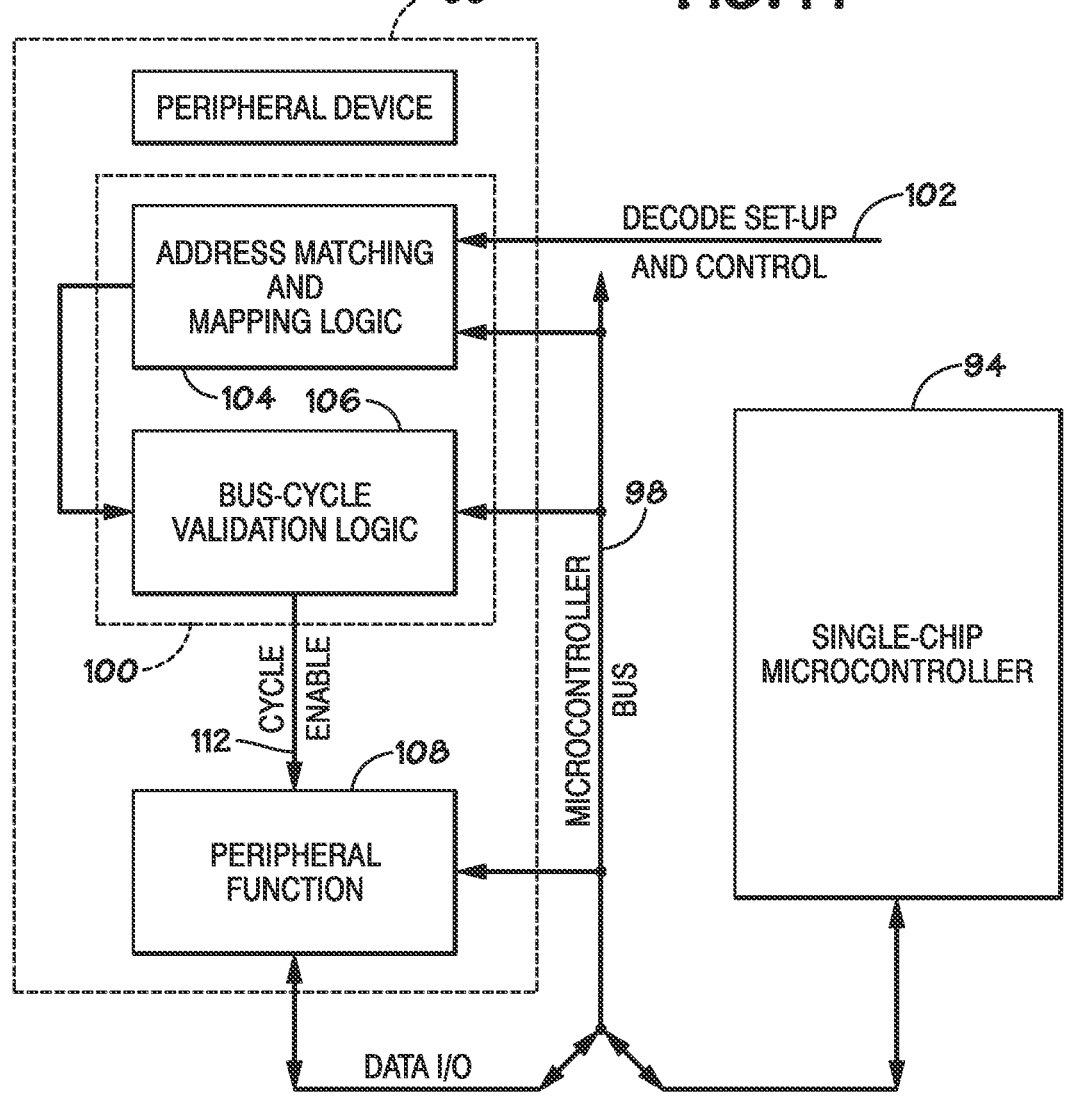
FIG. 14 depicts further details the embodiment the peripheral device and bus decoder depicted in FIG. 13.

FIG. 14 illustrates the self-selecting bus decoder 100, and included logic, in further detail. The self-selecting bus decoder 100 may include address-matching and mapping logic 104 and bus-cycle validation logic 106. The function provided by the peripheral device 96, such as data storage and/or data processing via included memory, is illustrated by the peripheral function block 108. As described above, the peripheral device 96 and the microcontroller 94 may communicate over a microcontroller bus 98. Any signals provided from the microcontroller 94 pass over the microcontroller bus 98 to the self-selecting decoder 100. The self-selecting decoder 100 processes any signals received from the microcontroller 94 and, as described further below, determines if the peripheral device should provide a response to the signal. The output from the peripheral device 96 may be provided to the microcontroller 94 over the microcontroller bus 98.

The address-matching and mapping logic 104 of the decoder 100 receives the decode set-up and control signal 102. The decode set-up and control signal 102 provides a memory mapping configuration to the address-matching and mapping logic 104. The decode set-up and control signal 102 may convey any other signals that configure the decoder 100. In some embodiments, the decode set-up and control signal 102 may be configured by electrically connecting pins or other electrical connections on the PCA, e.g., after connection of the peripheral device 96 to the PCA. The memory mapping configuration provided by the decode set-up and control signal 102 may specify a range of memory addresses provided by memory of the peripheral device 96, and/or a range of memory addresses provided by the microcontroller 94. For a given memory address range, the address-matching and mapping logic 104 may determine if the peripheral device 96 should respond to this address range, i.e., if the memory address range is "mapped" to the peripheral device 96.

In a bus cycle, the address-matching and mapping logic 104 may receive a signal from the microcontroller 94 that includes a memory address. Based on the memory mapping configuration provided by the decode set-up and control signal 102 and the memory address, the address-matching and mapping logic 104 may determine if the peripheral device 96 should be selected. If the memory address is in the range of memory addresses provided by the peripheral device 96, then the peripheral device 96 may be selected to fulfill any memory operation requested in the signal provided by the microcontroller 94.

The bus-cycle-validation logic 106 identifies the memory operation provided to the peripheral device 96 from the microcontroller 94. A request for a memory operation may be provided in the signal sent to the peripheral device 94 over the microcontroller bus 98. As stated above, this signal may also include a memory address, in addition to a request for a memory operation. For example, the bus-cycle validation logic 106 may determine if the requested operation is a direct memory access (DMA) operation, write, read, refresh, and/or any other operation. The bus-cycle validation logic 106 determines if a response may be provided by the peripheral device 96 and what type of response to provide.

If the bus-cycle validation logic 106 determines that the request from the microcontroller 94 may be properly satisfied by the peripheral device 96, the bus-cycle validation logic 106 may provide a cycle-enable signal 112 to initiate the peripheral function 108. The cycle-enable signal selects the peripheral function 108 of the peripheral device 96 to respond to the memory request. The peripheral function 108 provides the appropriate response to the memory request received from the microcontroller 94, such as write, read, refresh, etc. For example, in a read request, the peripheral function 108 may provide data to the microcontroller 94 over the microcontroller bus 98, such as the contents of the data at the specified memory address. Further, the response provided by the peripheral function block 108 may also provide status information to the microcontroller 94, such as an indication of the completion of the current operation, errors, etc.

It should be appreciated that the address-matching and mapping logic 104 and the bus-cycle validation logic 106 operate in parallel in each bus-cycle. That is, for each bus-cycle, the operations performed by each logic block of the self-select bus decoder 100 are executed in a single bus-cycle. For each memory operation requested by the microcontroller 94, the self-selecting bus decoder 100 determines if the request may be responded to by the peripheral device 96, determines if the request requires a response from the peripheral device 96, and selects the peripheral device 96 to provide the appropriate response.

Figure 15:
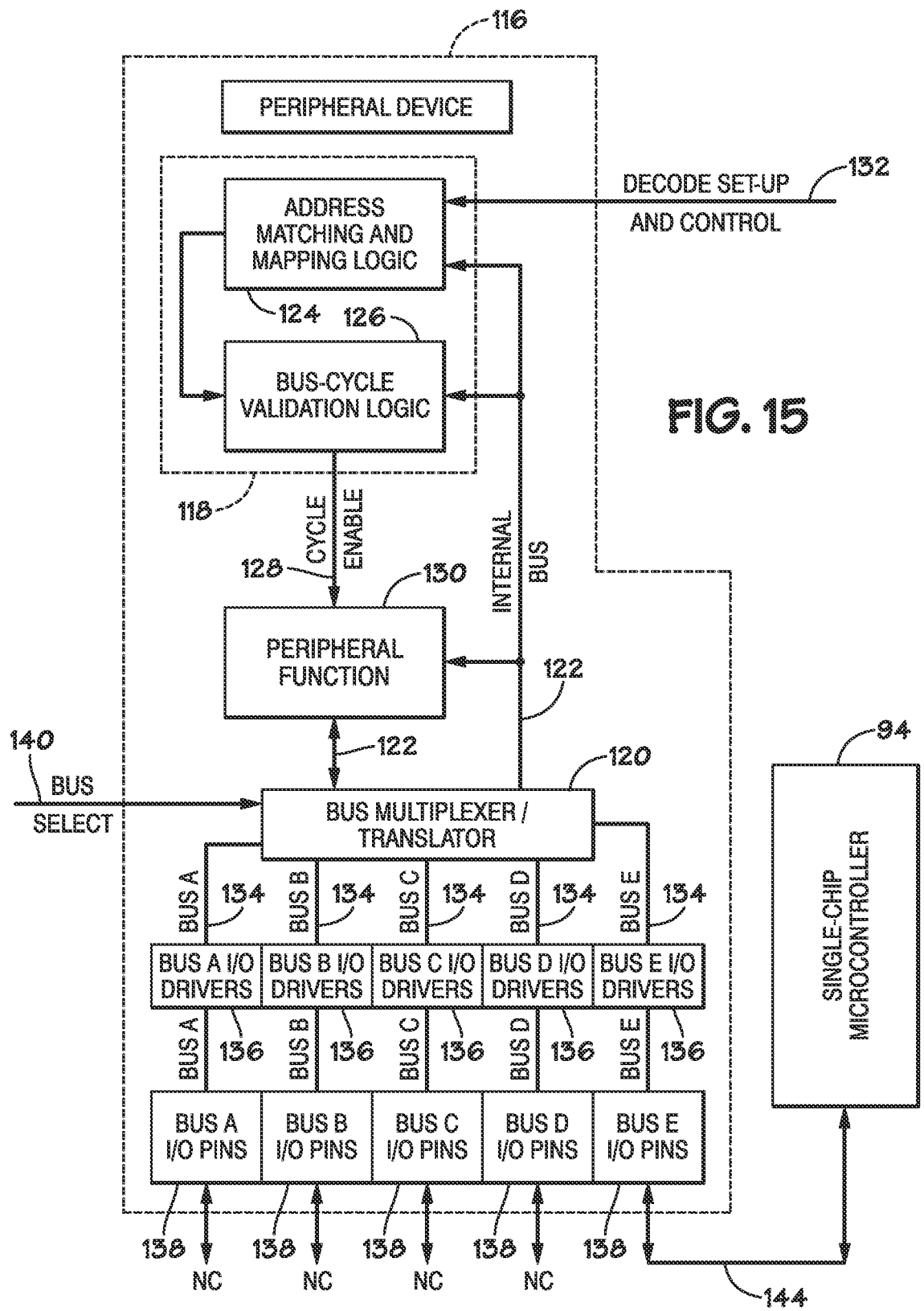
FIG. 15 depicts another embodiment of a peripheral device having a self-selecting bus decoder and a bus translator.

In some embodiments, a peripheral device with a self-selecting bus decoder 100 may include a bus translator, as further described in U.S. patent application Ser. No. 12/265,436 filed on Nov. 5, 2008, titled "Bus Translator," by Harold B Noyes et al. FIG. 15 depicts an embodiment illustrating the microcontroller 94 coupled to a peripheral device 116 having a self-selecting bus decoder 118 and a bus translator 120. The bus translator 120 and the self-selecting bus decoder 118 may communicate over an internal bus 122. The internal bus 122 provides any translated signals from the bus translator 120 to the self-selecting bus decoder 118. As described above, the self-selecting bus decoder 118 includes address-matching and mapping logic 124 and bus-cycle validation logic 126, and may provide a cycle-enable signal 128 to enable a peripheral function 130. As also described above, the address-matching and mapping logic 124 may receive a memory mapping configuration via a decode set-up and control signal 132.

The bus translator 120 may be configured to translate signals on each of the plurality of different types of buses 134 into signals that are appropriate for the self-selecting bus decoder 118 of the peripheral device 116 to receive through the internal bus 122 and vice-versa. To facilitate operation over the plurality of different types of buses 134, the bus translator may include a plurality of bus drivers 136 (e.g., drivers A-E), and a plurality of bus physical interfaces 138 (e.g., bus A-E I/O pins) The bus translator 120 may include a multiplexer or a demultiplexer to increase or decrease the number of signals that convey data between the internal bus 122 and a selected one of the plurality of different buses 134. The bus translator 120 may also be configured to adjust the timing of signals that convey data between the internal bus 122 and the selected one of the plurality of different buses 134 to be appropriate for each of the buses 134 and 122. The bus translator 120 may also be configured to adjust the voltage of signals conveying data between the internal bus 122 and the selected one of the plurality of different buses 134.

A control signal 140 may convey signals that configure the bus translator 120. For example, the control signal 140 may convey a signal that configures the bus translator 120 to select one of the different types of buses 134. In some embodiments, the control signal 140 may convey data that is stored in registers in the bus translator 120. In other embodiments, the control signal 140 may be omitted (which is not to suggest that any other feature described herein may not also be omitted), and the bus translator 120 may be configured by blowing fuses within the bus translator 120 during manufacturing or by electrically connecting pins or other electrical connections on the peripheral device 116, e.g., with a jumper, after the peripheral device 116 is manufactured. The peripheral device 116 may be configured to automatically detect which of the different types of buses 134 is being used, e.g., by selecting a bus based on which of the physical bus interfaces 138 is connected to an external bus.

The plurality of different buses 134 may include several different types of buses. For example, the plurality of different buses 134 may include an asynchronous bus with non-multiplexed address and data, an asynchronous bus with multiplexed address and data, a synchronous bus with non-multiplexed address and data, a synchronous bus with multiplexed address and data, a synchronous dynamic random access memory (SDRAM) bus, a double data rate (DDR) bus, a DDR2 bus, a DDR3 bus, a DDR4 bus, a PCI bus, a PCI express bus, a PCIx bus, a security gateway management interface (SGMI) bus, or other types of buses.

The peripheral device 116 may communicate with the microcontroller 94 through a microcontroller bus 144. The microcontroller bus 144 may be one of the types of buses that are compliant with the plurality of different buses 134 coupled to the bus translator 120 within the peripheral device 116. The microcontroller bus 144 may couple to the physical bus interface 138 that is appropriate for the microcontroller bus 144. For example, if the microcontroller bus 144 is a DDR2 bus, it may couple to a physical bus interface 138 that is compliant with the DDR2 bus specification. The other physical bus interfaces may remain unused.

As data is conveyed between the microcontroller 94 and the peripheral device 116, the bus translator 120 may translate the signals. Translating the signals may include multiplexing or demultiplexing the signals, increasing or decreasing the timing of the signals, or changing the voltage of the signals. Regardless of which of the plurality of different buses 134 is selected, the translated signals on the internal bus 122 may be similar or the same, and the bus translator 120 may be configured to receive the signals and transmit the signals through the internal bus 122.

As described above, the microcontroller 94 may request one or more memory operations in a signal sent to the peripheral device 116. In the embodiment depicted in FIG. 15, the signal is first received by the bus translator 120 through the physical bus interface 138 and one of the plurality of different buses 134. After the signal is translated through the bus translator 120, the self-selecting bus decoder 118 may process the signal as described above. For example, the address-matching and mapping logic 124 may determine if a memory address of the signal is provided by the memory of the peripheral device 116, and the bus-cycle validation logic 126 may determine the type of memory operation and the appropriate response. If the self-selecting bus decoder 118 determines that the peripheral device 116 can respond to the request from the microcontroller 94, the self-selecting bus decoder 118 may output the cycle enable signal 128 to select the peripheral function 130 of the peripheral device 116. Any response provided by the peripheral function 130 may be sent as an output signal to bus translator 120 via the internal bus 122. The bus translator 120 can translate the output signal of the peripheral function 130 to the selected one of the plurality of different buses 134. The response, e.g., the output signal from the peripheral function 130, is then sent over the microcontroller bus 144 to the microcontroller 94.

Figure 16:
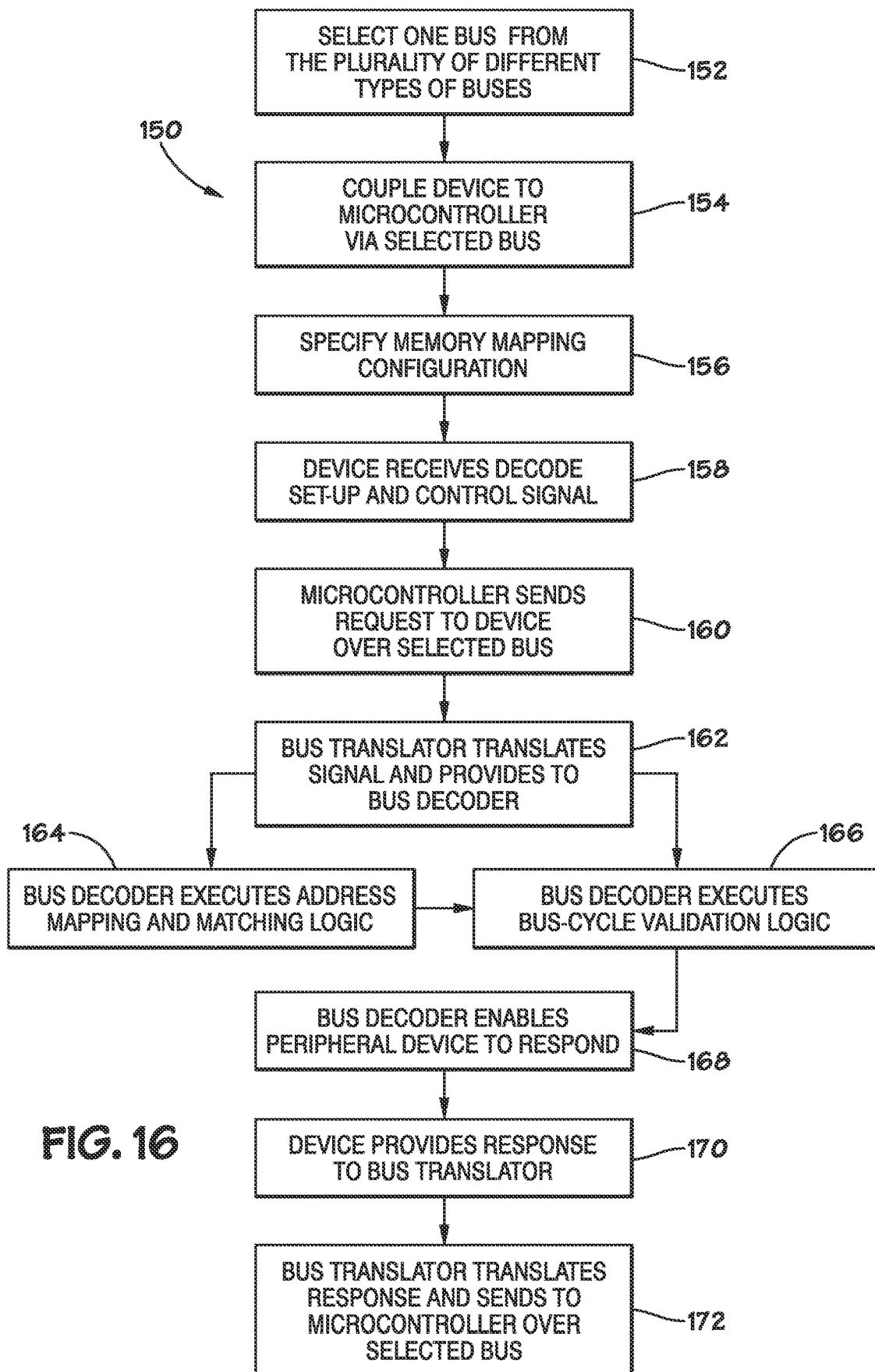
FIG. 16 depicts an embodiment of a process of operation of the peripheral device having a self-selecting bus decoder.

FIG. 16 illustrates an example of a process 150 for operating a peripheral device with a self-selecting bus decoder. The process 150 may begin with selecting a bus from among a plurality of different buses available to peripheral device (block 152). Selecting one bus among the plurality of different buses may be performed after or during the manufacture of the device. The plurality of different types of buses may include any of those described above. The device may be configured to communicate through two or more buses, three or more buses, four or more buses, five or more buses, or six or more buses. Alternatively, as discussed above, certain embodiments may omit a bus translator and configuration of bus type, e.g., if the microcontroller and peripheral device communicate over the same or a similar bus.

The peripheral device may be coupled to a microcontroller through the selected bus (block 154). Coupling the peripheral device to the microcontroller through the selected bus may include installing the device on a PCA, e.g. a system board, motherboard, etc.

A memory mapping configuration may be specified (block 156), such as through pins or other electrical connections on the PCA, that maps a range of address to the peripheral device and/or a range of addresses to the microcontroller. As described above, the self-selecting bus decoder of the peripheral device may receive a decode set-up and control signal that provides the memory mapping configuration (block 158).

The microcontroller coupled to the peripheral device may make a request for a memory operation at a certain memory address or addresses, such as by sending a signal over the selected bus, i.e., one of the buses selected from one of the plurality of different buses coupled to the bus translator, to the peripheral device (block 160). The bus translator may translate the request from the microcontroller and provide the translated request to the self-selecting bus decoder over an internal bus of the device (block 162).

As described above, in a bus-cycle, the self-selecting bus decoder may execute the address-matching and mapping logic (block 164) and the bus-cycle validation logic (block 166) in parallel. The address-matching and mapping logic determines that the memory address or addresses of the request are in the range of memory addresses provided by the peripheral device (block 164). The bus-cycle validation logic determines the type of memory operation of the request and determines the appropriate response (block 166).

After processing by the address-matching and mapping logic and the bus-cycle validation logic, the self-selecting bus decoder may enable the peripheral device to respond to the request (block 168), e.g., through a cycle-enable signal provided to a function of the peripheral device. The response to the request is provided to the bus translator (block 170). The bus translator translates the response and sends the response to the microcontroller (block 172), such as by sending a signal over the selected one of the plurality of different buses coupled to the bus translator.

The process 150 is believed to reduce the cost and difficulty of adding functionality to microcontrollers via addition of a peripheral device. Because the peripheral device may self-select based on a requested memory operation from the microcontroller and may communicate through a variety of different types of buses, the peripheral device may be used and coupled to a microcontroller without the addition of other components to the microcontroller or between the peripheral device and the microcontroller.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. Bus-cycle validation circuitry, configured to:
   receive, from a microcontroller, a request to perform a memory operation;
   determine whether the request can be satisfied by a peripheral device associated with the bus-cycle validation circuitry; and
   upon determining that the request can be satisfied by the peripheral device, provide a signal to peripheral function circuitry of the peripheral device to initiate a peripheral function of the peripheral device to satisfy the request.

2. The bus-cycle validation circuitry of claim 1, wherein the signal comprises a cycle-enable signal that triggers selection of the peripheral function of the peripheral device to provide a response to the request.

3. The bus-cycle validation circuitry of claim 1, wherein the peripheral function comprises a memory operation, comprising a direct memory access (DMA) operation, a memory write operation, a memory read operation, a memory refresh operation, or any combination thereof.

4. The bus-cycle validation circuitry of claim 1, configured to receive the request from the microcontroller via a bus translator communicatively coupled to the bus-cycle validation circuitry.

5. The bus-cycle validation circuitry of claim 1, disposed within the peripheral device.

6. The bus-cycle validation circuitry of claim 1, configured to run in parallel with address mapping logic that determines whether the request is intended for the peripheral device.

7. The bus-cycle validation circuitry of claim 1, disposed within a self-selecting bus decoder tasked with selecting the peripheral device for satisfying the request.

8. The bus-cycle validation circuitry of claim 3, wherein the peripheral function comprises the memory read operation and the signal is configured to initiate execution of the peripheral function to provide a response to the request, the response to the request comprising an indication of contents of data at a specified memory address provided in the request.

9. The bus-cycle validation circuitry of claim 3, wherein the peripheral function is configured to provide a response to the request, the response to the request comprises a status indication of the peripheral function.

10. The bus-cycle validation circuitry of claim 4, configured to cause the peripheral function to provide a response to the request to the bus translator.

11. The bus-cycle validation circuitry of claim 5, wherein the peripheral device is communicatively coupled to the microcontroller via one or more printed circuit traces.

12. The bus-cycle validation circuitry of claim 9, wherein the status indication comprises:
an indication of completion of the peripheral function,
an indication of error in performance of the peripheral function, or both.

13. A method, comprising:
receiving, at bus-cycle validation circuitry a request to perform a memory operation;
determining whether the request can be satisfied by a peripheral device associated with the bus-cycle validation circuitry; and
upon determining that the request can be satisfied by the peripheral device, providing a signal to peripheral function circuitry of the peripheral device to initiate a peripheral function of the peripheral device to satisfy the request.

14. The method of claim 13, wherein the signal comprises a cycle-enable signal that triggers selection of the peripheral function of the peripheral device to provide a response to the request; and
wherein the peripheral function comprises a memory operation, comprising a direct memory access (DMA) operation, a memory write operation, a memory read operation, a memory refresh operation, or any combination thereof.

15. The method of claim 13, wherein a response to the request comprises a status indication of the peripheral function, the status indication comprising:
an indication of completion of the peripheral function,
an indication of error in performance of the peripheral function, or both.

16. The method of claim 13, comprising:
receiving the request from a microcontroller via a bus translator communicatively coupled to the bus-cycle validation circuitry; and
causing the peripheral function to provide a response to the request to the bus translator.

17. The method of claim 13, comprising:
identifying a type of the peripheral function based upon the request; and
identifying a type of response to provide based upon the type of the peripheral function.

18. A peripheral device, comprising:
a memory;
peripheral function circuitry configured to implement a peripheral function on the memory; and
bus-cycle validation circuitry, configured to:
receive, from a microcontroller external to the peripheral device, a request to perform a memory operation;
determine whether the request can be satisfied by the peripheral device; and
upon determining that the request can be satisfied by the peripheral device, provide a signal to the peripheral function circuitry to initiate the peripheral function on the memory, to satisfy the request.

19. The peripheral device of claim 18, comprising: a copier, a scanner, a printer, a game console, a television, a set-top video distribution or recording system, a cable box, a personal digital media player, a factory automation system, an automotive computer system, a medical device, or any combination thereof.

20. The peripheral device of claim 18, wherein the bus-cycle validation circuitry is configured to run in parallel with address mapping logic that determines whether the request is intended for the peripheral device.

* * * * *